(12) United States Patent
Levy

(10) Patent No.: US 11,030,884 B1
(45) Date of Patent: Jun. 8, 2021

(54) REAL-TIME PREVENTION AND EMERGENCY MANAGEMENT SYSTEM AND RESPECTIVE METHOD OF OPERATION

(71) Applicant: YOOSEC LDA, Ponta Delgada (PT)

(72) Inventor: Sam Levy, Ponta Delgada (PT)

(73) Assignee: YOOSEC LDA, Ponta Delgada (PT)

( * ) Notice: Subject to any disclaimer, the term of this patent is extended or adjusted under 35 U.S.C. 154(b) by 0 days.

(21) Appl. No.: 17/082,345

(22) Filed: Oct. 28, 2020

(30) Foreign Application Priority Data

Oct. 14, 2020 (PT) .......................................... 116823

(51) Int. Cl.
*G08B 27/00* (2006.01)
*G06N 5/04* (2006.01)
*G06N 20/00* (2019.01)

(52) U.S. Cl.
CPC ............. *G08B 27/001* (2013.01); *G06N 5/04* (2013.01); *G06N 20/00* (2019.01)

(58) Field of Classification Search
CPC .................................................. G08B 27/001
See application file for complete search history.

(56) References Cited

U.S. PATENT DOCUMENTS

| | | | |
|---|---|---|---|
| 2009/0048690 A1* | 2/2009 | Miller | G06N 5/04 700/54 |
| 2020/0242916 A1* | 7/2020 | Krstanovic | A62C 3/0271 |
| 2020/0278894 A1* | 9/2020 | Patton | G06F 9/542 |

\* cited by examiner

*Primary Examiner* — Travis R Hunnings
(74) *Attorney, Agent, or Firm* — Mark M. Friedman

(57) ABSTRACT

The present invention discloses a real-time prevention and emergency management system and respective method of operation.
The system comprises a Central Processing Unit (1), a plurality of Local Units (2), a plurality of Local Entities (3) and a plurality of Agent Entities (4), which are connected together by means of a communication network (5).
The architecture of the system implements a stratified hierarchical scheme, where the elements are organized in 3-layers, being the Central Processing Unit (1) the core-knowledge and processing element. The Local Units (2), belong to a second layer, and are responsible for generating processed-data from event's raw data collected by the Agent Entities (4) and Local Entities (3), representing a third layer, that are assign to each Local Unit. The Agent Entities (4) can be of a singular or collective type, and are organized according to a hierarchical scheme.

15 Claims, 4 Drawing Sheets

REAL-TIME PREVENTION AND EMERGENCY MANAGEMENT SYSTEM AND RESPECTIVE METHOD OF OPERATION

FIELD OF THE INVENTION

The present invention is enclosed in the field of intelligence warning and actuation. More particularly, the present invention relates to systems and methods for performing risk prevention and emergency management of events.

PRIOR ART

Solutions exist in the art, such as the case of patent application U.S. Pat. No. 7,644,056, for performing risk prevention and emergency management. The referred patent application describes a system for providing terrorism indications and warning, consisting of multiple tasks that create warning products on a Website and in which the associated computer program maintains a Webpage that tracks and displays each analyst's pending tasks based on their assigned responsibilities in the system. A warning level is determined combining mathematical probability rules and theories.

Document U.S. Pat. No. 6,408,404 describes an architecture for intelligent systems used to perform terrorist activity analysis, low intensity conflict monitoring, military intelligence, and strategic threat assessment. It provides monitorization of data streams, more particularly, providing situation awareness by monitoring incoming data streams using a rule base. Said incoming data streams may be sent by several agents or can be incoming message traffic. According to said document, it is provided a method and system in which one or more data streams are sent to a computer and then are sorted using a rule base into streams representative of events, and can be displayed as event streams on a time line. Actions can be taken based upon specified events.

Finally, document U.S. Pat. No. 9,292,874 discloses an integrated risk management tool, including a persistent object database to store information about actors (individuals and/or groups), physical surroundings, historical events and other information. The risk management tool also includes a decision support system that uses data objects from the database and advanced decision theory techniques, such as Bayesian Networks, to infer the relative risk of an undesirable event. As part of the relative risk calculation, the tool uses a simulation and gaming environment in which artificially intelligent actors interact with the environment to determine susceptibility to the undesired event.

The existing solutions are probability based and are a form of risk measurement matrix. Because of that, the actions to be taken in each case are triggered based on inferred probabilities and on rules which makes such methodology unable to adapt effectively and in a reasonable time to unexpected events and its respective multidisciplinary challenges. Therefore, the present solutions cannot be as efficient as they could be if they were based on active feedback provided by agents or sensor's infrastructures installed in the vicinities or actually at the site where the event occurred. Moreover, none of the existing solutions are able to or even considers the natural evolution that an event, such as a fire or a terrorist attack, may have and its impact on the intelligence indications to be provided.

The present solution intended to innovatively overcome such issues.

SUMMARY OF THE INVENTION

It is therefore an object of the present invention a real-time prevention and emergency management system and respective method of operation. Such system and method, provides real-time management of emergencies preventing and securing emergency situations in multiple sectors that span a wide spectrum. From quality control and crisis prevention to ongoing event management, the system is tailored to prevent, mitigate and manage emergency events through innovative channels of activity, and can handle any emergency situation by intelligently analysing active feedback collected from the event's site and/or its vicinities.

The system consists of creating a real time prevention and emergency management platform for a plurality of scenarios. Due to the technical architecture and respective elements that embodies the system, it is possible to identify suspicious behaviour, people, activity in real time through a very intelligent automatic methodology that detects and identifies suspicious signals, performs real time analysis and generates an automatic process that delivers an actual threat classification and risk level which generates an event report to relevant sources and delivers exact directives for specific response mechanisms. The system is able to translate human intelligent data and generate the solution associated with that risk.

Based on the type of event, the system automatically generates a set of response tools that diffuse critical data to different Agent Entities depending on their location, proximity to the event's site, capabilities and status. The system also can diffuse automatically the processed relevant data automatically to the most relevant emergency organizations that need to reach the affected area. An advantage of the system is related to providing to people affected by the emergency a specific automatically generated set of tools. In addition, all these activities are automatically generated in real time into a live dashboard that generates automatic dynamic solutions until the event is finished.

The technical elements that define the architecture of the system now developed are adapted to: a) provide multi-site and automatically adaptation to the particularities of any event; b) generate real-time automatic reports; c) implement an adaptative flow of action; d) provide automatic directives, protocols or live suggestions; e) automatically generate briefings, best practices based on type of event; f) perform deductive and inductive automatic processes through an algorithm that delivers output through incoming details of the event; g) neutralize distortions, wrong perceptions and personal interpretation, transform the decision-making process into an objective rational process in few seconds.

c.—Generating at least one event model by the Central Processing Unit (1), based on the processed raw data sent by at least one Local Entity (2);

d.—sending intelligence indications by the Central Processing Unit (1), to Agent Entities (4).

Figure 1:
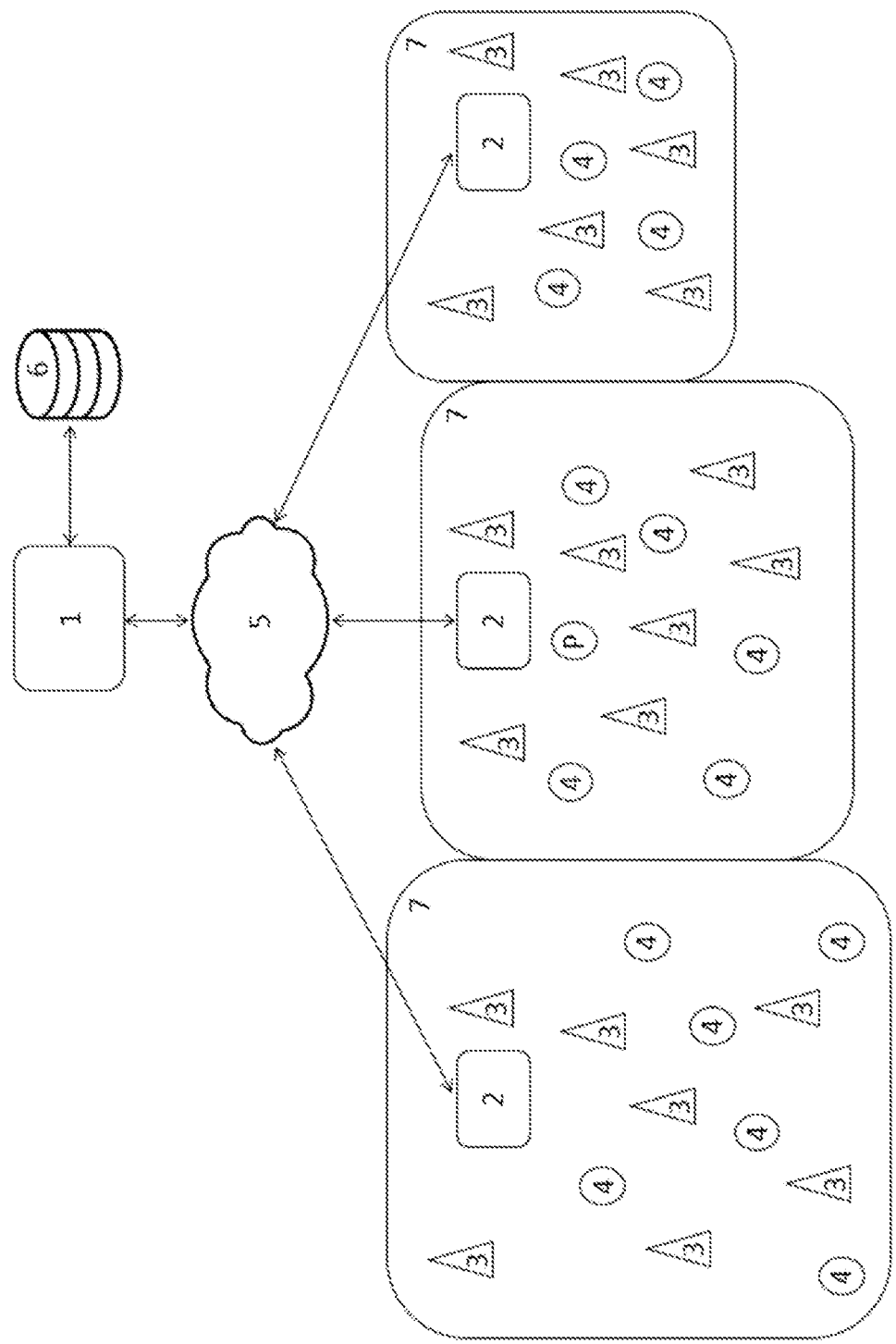
FIG. 1—representation of an embodiment of the system's architecture, where the reference signs represent:
   1—Central Processing Unit;
   2—Local Unit;
   3—Local Entity;
   4—Agent Entity;
   5—Network;
   6—Event base-model database;
   7—Geographical cluster associated to each Local Unit.
Figure 2:
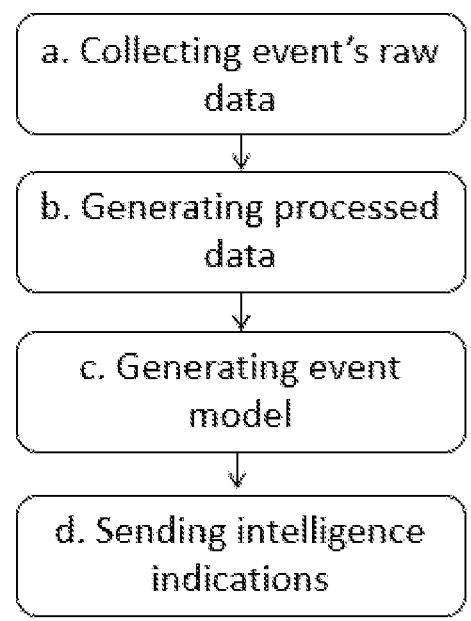
FIG. 2—representation of the fundamental steps of the method of operating the system developed. The reference signs represent:
   a.—Collection of event's raw data by several Agent Entities (4) and Local Entities (3);
   b.—Generation of processed-data by the Local Units (2), based on the event's raw data collected by the Agent Entities (4) and Local Entities (3) assigned to it.
Figure 3:
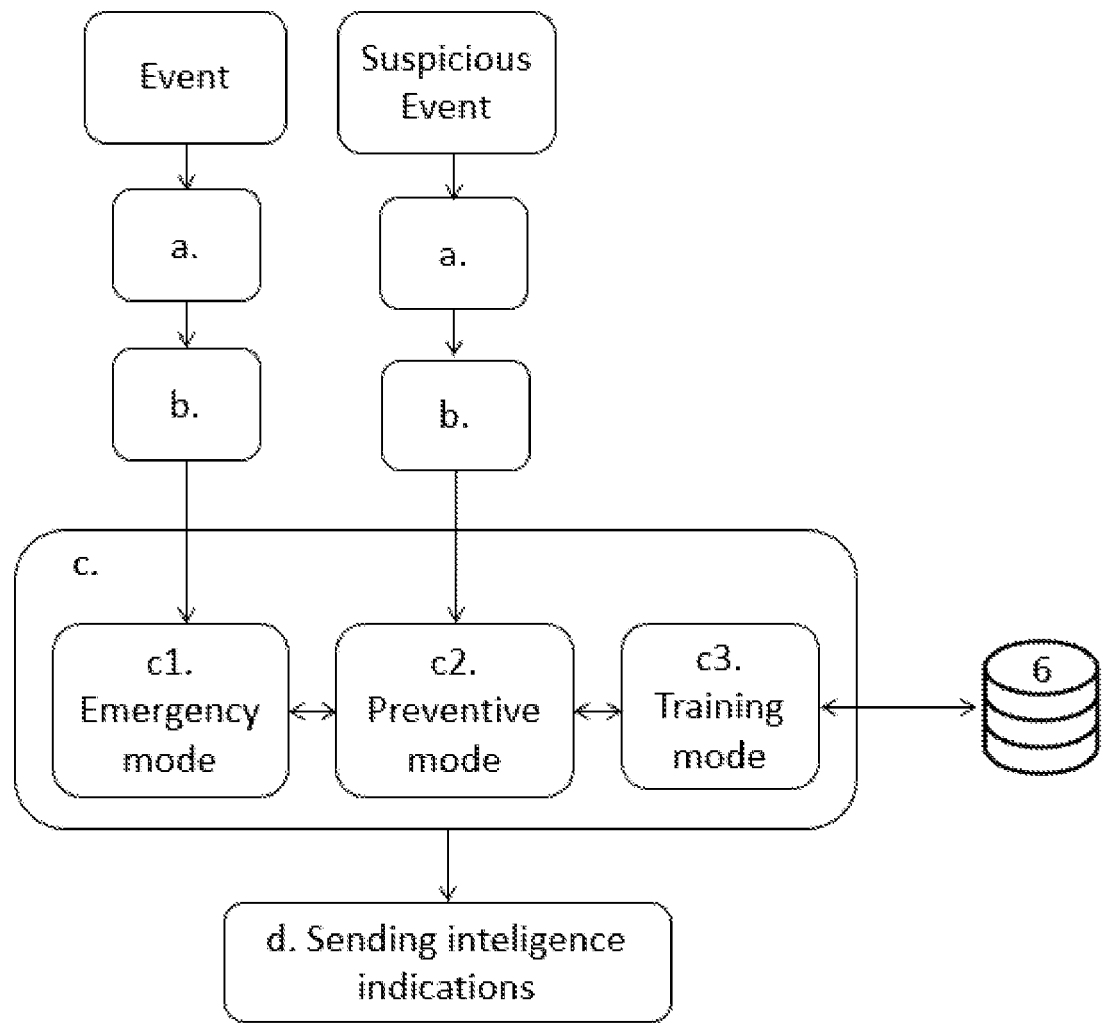

FIG. 3—representation of the method of operating the system developed, considering the case where an event has occurred and where a suspicious event is detected. Particularly, it illustrates the three interchangeable modes of operation of the Central Processing Unit (1), that modulates the generation of the event models and respective intelligence indications. The reference signs represent:

a.—Collection of event's raw data by several Agent Entities (4) and Local Entities (3);

b.—Generation of processed-data by the Local Units (2), based on the event's raw data collected by the Agent Entities (4) and Local Entities (3) assigned to it;

c.—Generation of at least one event model depending by the Central Processing Unit (1), which can operate according to the following modes:

c1.—Emergency mode, where the Central Processing Unit (1) is processing event's data;

c2.—Preventive mode, where the Central Processing Unit (1) is processing suspicious event's data;

c3.—Training mode, where the Central Processing Unit (1) simulates an event based on past event models that are stored (6), in order to improve its response by generating accurate and efficient intelligence indication, considering the difficulties that each different event may impose.

d.—sending intelligence indications by the Central Processing Unit (1), to Agent Entities (4).

Figure 4:
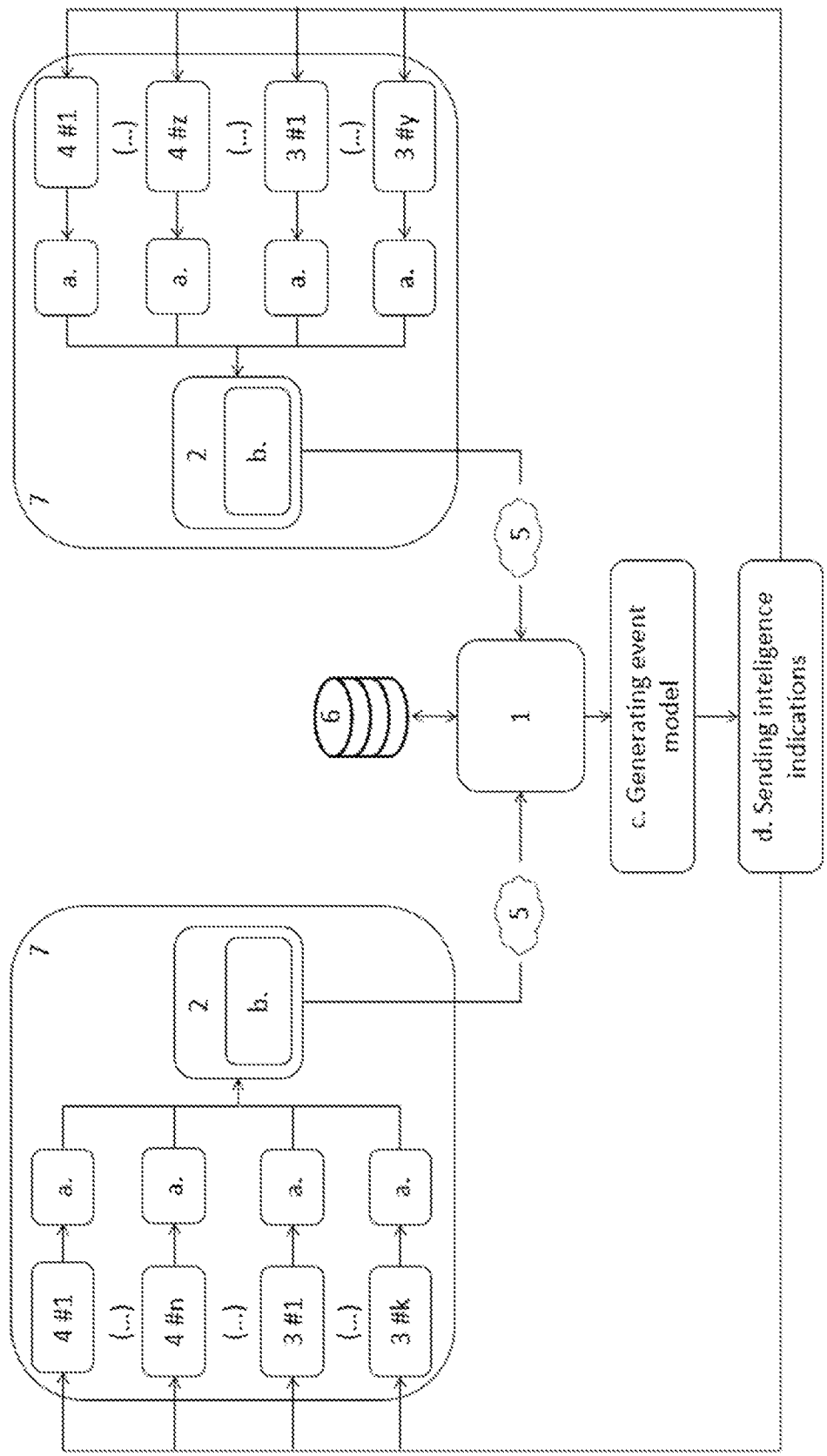

FIG. 4—representation of an embodiment of the system, where the technical elements are illustrated together with the actions they execute in the context of the method of operation of the system. The reference signs represent:

1—Central Processing Unit;
   c.—Generating at least one event model by the Central Processing Unit (1), based on the processed raw data sent by at least one Local Entity (2);
   d.—Sending intelligence indications by the Central Processing Unit (1), to Agent Entities (4).

2—Local Unit
   b.—Generation of processed-data by the Local Units (2), based on the event's raw data collected by the Agent Entities (4) and Local Entities (3) assigned to it;

3—Local Entities;

4—Agent Entities;
   a.—Collection of event's raw data by several Agent Entities (4) and Local Entities (3);

5—Network;

6—Event base-model database;

7—Geographical cluster associated to each Local Unit.

DETAILED DESCRIPTION

It is the object of the present invention, a system and respective method for generating intelligence indications in order to perform real-time prevention and emergency management of events, based on event's raw data that are collected by the Entities (3, 4) of the system.

In the context of the present application, an event is a situation that poses an immediate risk to health, life, property or environment. Therefore, by way of example only, a type of event may relate to a fire, a terrorist attack, a robbery, a traffic accident or a natural catastrophe. A suspicious event, in the context of performing real-time prevention management, relates to evidences that are detected by the elements of the system and that could lead to the occurrence of an actual event. In connection to it, an event's raw data relates to data of an event or a suspicious event, that is collected from the event's site or its vicinities. It may relate to information of any kind, such as topography information of the event's site, event's time, number of people involved in the event, information referring to the appearance or non-verbal communication of people in the event's site, etc. It may also relate to health status of a user carrying an Agent Entity (4), such as the heart rate, blood pressure, body temperature, motion evaluation.

In one embodiment, the system is network-based and comprises a Central Processing Unit (1), a plurality of Local Units (2), a plurality of Local Entities (3) and a plurality of Agent Entities (4). All the elements are connected to each other by means of a network (5) which is used for data-exchange purposes. Any type of communication network (5) can be used, depending on the specificities and practical implementation considerations of each case.

The Central Processing Unit (1) is the core-knowledge and processing element. It comprises processing means programmed to generate event models of an event or of a suspicious event, based on processed-data that is sent by Local Units (2). Due to the stratification imposed by the architecture of the system, the Central Processing Unit (1) is able to process event's data collected from different geographic locations at the same time, which represents an advantage in case of multiple events occurring where particular intelligence indications must be provided for each one. In that case, the Central Processing Unit (1) is able to process each event independently and to generate different event models each one containing intelligence indications adapted to the respective specificities. An event model is a report that includes information regarding the event, particularly the type of the event, the time of the event, the location of the event, the number of Agent Entities (4) that reported it and also contain information associated to the event's raw data collected by the Local Entities (3) and by the Agent Entities (4). It is based on that information that intelligence indications are generated by the Central Processing Unit (3).

As a second tier of the system's architecture, a Local Unit (2) is a processing module able to be incorporated in an ordinary security system of an organization such as an hospital, a shopping mall or an airport. The role of a Local Unit (2) is to gather event's raw data, either related to an event or a suspicious event, collected by a plurality of Local Entities (3) and Agent Entities (4) located within the respective geographical cluster (7), and to generate processed-data to be sent to the Central Processing Unit (1), for the purpose of preparing at least one event model and generating intelligence indications. The geographical clusters (7) are associated to each Local Unit (2) and define a predefined geographical extension within which the Agent Entities (4) and Local Entities (3) are assigned to the respective Local Unit (2), The geographic extension of each cluster may vary being defined by the Central Processing Unit (1).

As a third layer of the system's architecture, a Local Entity (3) and an Agent Entity (4) are sensory entities that are responsible for feeding the Central Processing Unit (1) with event's data. Particularly, a Local Entity (3) comprises sensory means adapted to collect event's raw data from an event's site or its vicinity, located within the geographical cluster of the Local Unit (2) to which is assigned. For the purpose of the system, a Local Entity (3) may be any monitoring apparatus projected to periodically or continuously collect sensorial data. It may relate to devices or systems already operating in an organization, or to indoor or outdoor surveillance camera systems installed in streets or shops, for example. Particularly, in one embodiment of the system, the sensory means of a Local Entity (3) includes video and audio sensors configured to collect raw data in the form of a stream of video or audio data, respectively. Even more particularly, the sensory means of a Local Entity (3) may further include a plurality of sensor units, such sensor units being of acoustic, sound, vibration, chemical, temperature, environment or proximity type.

In its turn, an Agent Entity (4) is a processing device comprising input and output means configured to collect event's raw data, from an event's site or its vicinity, within a geographical cluster of the Local Unit (2) to which is assigned and to receive event's intelligence indications. The Agent Entity (4) may be smartphone, making use of its sensory abilities to collect event's raw data of different types, either related to the event or to a user carrying it. In fact, the smartphone may establish a connection with a wearable health device being used, for the purpose of collecting data related to heart rate, blood pressure, body temperature, allowing to provide information about the health status of a person carrying the Agent Entity (4).

In another embodiment of the system, each Local Unit (2) further comprises an Agent's list management Entity. Said Entity is adapted to manage a list of the Agent Entities (4) which are assigned to a Local Unit (2) at a given time, being comprised by processing means programmed to assign an Agent Entity (4) which current geographic location is within the geographical cluster (7) of a Local Unit (2), and update the list of Agents, and to remove an Agent Entity (4) from the list of Agents assigned to a Local Unit (2) which current geographic location is not within the geographical cluster (7) of said Local Unit (2). The list of Agents of each Local Unit (2) is also shared with the Central Processing Unit (1), so the Central Processing Unit (1) knows what are Agent Entities (4) assigned with each Local Unit (2) at any instant, allowing to control more rigorously the impact of each event and the generation of intelligence indications directed to each Agent Entity (4). Additionally, the Local Unit (2) is configured to establish a bidirectional communication channel with at least one Agent Entity (4) of the list of Agents assigned to it. Based on said communication channel, the Local Unit (2) may request to an Agent Entity (4) to provide supplementary event's raw data, for the purpose of preparing the processed-data to be sent to the Central Processing Unit (1). Said request for supplementary event's raw data may have a form of a query interface comprising a set of question for which further event's site information is required. Said supplementary raw data may be provided automatically by the Agent Entity (4) or may be inputted by a user carrying the Agent Entity (4).

In another embodiment of the system, it further comprises an event base-model database where past event models and respective intelligence indications are stored. The Central Processing Unit (1) is further programmed to access to the event base-model database (6) to select an event model based on processed-data sent by Local Units (2). By using data from past events, the Central Processing Unit (1) is able to provide more exact intelligence indications and also to predict more accurately the evolution of an event. In connection to it, the Central Processing Unit (1) further comprises an Artificial Intelligence module. Said Artificial Intelligence Module is configured to determine an event's thread classification and a risk level, based on the processed-data sent by Local Units (2) and based on the event models stored in the event base-model database (6). Furthermore, the Artificial Intelligence Module is configured to generate the event model and the respective intelligence indications based on said thread classification and risk level.

In another embodiment of the system, each Agent Entity (4) may be of a collective or a singular type. According to this embodiment, a collective-Agent may be a multidisciplinary processing device further comprising means for controlling a plurality of emergency actuation modules. Therefore, apart from being a sensory entity in a first place, a collective-player has also the role of implementing intelligence indications that requires interactions with physical structures or the environment surround the event. Emergency actuation modules may be or not be a part of an ordinary security system wherein a Local Unit (2) is incorporated, and may relate to dedicated sirens, speakers, alarm sounds, entrance control mechanisms and emergency light guidance mechanism. A singular-Agent is any mobile processing device, such as a smartphone.

In connection to it, in another embodiment of the system, the Central Processing Unit (1) comprises a manager Entity configured to implement a multilevel-hierarchical scheme, wherein to each Agent Entity (4) is attributed a rank value. More particularly, the manager Entity is programmed to dynamically attribute a rank value of each Agent Entity (4) based on the thread classification and risk level of the event model, the type of Agent Entity (4); and the Agent's location and the Local Unit to which it is assigned, in relation to the location of the event. A list of Agents and respective rank values are stored in memory means of the Central Processing Unit (1), and for that purpose, the manager Entity and the Agent's list management Entity of each Local Unit (2) are operatively connected. The implementation of such hierarchical scheme, allows the Central Processing Unit (1) to generate custom intelligence indications according to the different characteristics of each Agent Entity (4), offering a greater flexibility in terms of dissemination and implementation of security protocols and preventive measures. The advantageous aspects of the present system also allow to take into consideration the evolution of an event in time, and its repercussions on neighbouring geographical clusters (7). Particularly, by means of the structural organization disclosed, based on stratification and hierarchy of functions/roles between all the elements of the system, it becomes possible to generate intelligence indications to Agent Entities (4), of a singular or collective type, which will be affected or can be affected by the evolution of the event.

In this regard, in another embodiment of the system, the intelligence indications contained in an event model, are generated by the Central Processing Unit (1) for each Agent Entity (4), based on the respective rank value. The intelligence indications may contain live recommendations, security directives and emergency protocol instructions to be followed by users and/or to actuate any emergency actuation module.

In another embodiment of the system, it further comprises a communication platform configured to establish a bidirectional data communication protocol adapted to transmit event's intelligence indications from the Central Processing Unit (1) to Agent Entities (4) via SMS, phone call, audio signal, video signal, push notifications, email or coded control information. Particularly, coded control information may relate to operative instructions configured to operate an emergency actuation module. Furthermore, the communication platform also comprises an interface module configured receive input parameters from an Agent Entity (4) and to implement a graphical interface of a dashboard of events. The Central Processing Unit (1) is further configured to update the dashboard of events based on processed-data sent by Local Units (2) and on event's intelligence indications generated to a particular Agent Entity (4) by the Central Processing Unit (1).

It is also an object of the present invention, a method of operating the system described in the above paragraphs. The method comprises the following steps:

Collecting event's raw data by a plurality of Agent Entities (4) and Local Entities (3), assigned to a Local Unit (2);

Generating processed-data by a Local Unit (2), based on the event's raw data collected by the Agent Entities (4) and Local Entities (3) assigned to it;

Generating an event model by the Central Processing Unit (1) based on the processed-data sent by Local Units (2);

Sending intelligence indications to a plurality of Agent Entities (4) by the Central Processing Unit (1).

In one embodiment of the method, the Central Processing Unit (1) is adapted to operate in two modes of operation:

a preventive mode (c2.), wherein the event's raw data relates to a suspicious event; and an emergency mode (c1.), wherein the event's raw data relates to an event.

According to this embodiment, the intelligence indications are generated by the Artificial Intelligence module of the Central Processing Unit (1), based on a thread classification and on a risk level, and the Central Processing Unit (1) is adapted to operate in both modes of operation at the same time depending on the Agent's location within a geographical cluster (7) of a Local Unit (2), in relation to the location of an event and of a suspicious event. In fact, due to the structural organization of the system, based on stratification and hierarchy of functions/roles between all the elements, the Central Processing Unit (1) can operate in the emergency mode (c1.) for generating intelligence indications for Agent Entities (4) within a geographical cluster (7) where the event took place, and operate in the preventive mode (c2.) for Agent Entities (4) of neighbouring clusters (7), for which the event may evolve.

In another embodiment of the method, the Central Processing Unit (1) is further adapted to operate in a training mode (c3.), wherein the Artificial Module of the Central Processing Unit (1) is adapted to simulate a real event based on the event's raw data related to a suspicious event and on the event models stored at an event base-model database (6). Particularly, the output of the training mode (c3.) may be used by the Artificial Intelligence Module of the Central Processing Unit (1) to improve the accuracy and efficiency of the intelligence indications generated for each case.

In another embodiment of the method, the Central Processing Unit (1) generates an event model depending on:
the type of event;
the location of the event;
the number of Agent Entities (4) sending event's raw data within the geographical cluster (7) of a Local Unit (2) to which is assigned.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A Real-time prevention and emergency management system characterized by comprising:
A network interconnecting for data-exchange purposes the following elements:
A Central Processing Unit;
A plurality of Local Units;
Each Local Unit having assigned a plurality of Local Entities and a plurality of Agent Entities; wherein,
The Central Processing Unit comprises processing means programmed to generate an event model of an event or suspicious event, based on processed-data sent by Local Units; said event model comprising event's intelligence indications;
Each Local Unit comprises processing means adapted to generated processed-data based on event's raw data collected by Local Entities and by Agent Entities assigned to it; said event's raw data relating to a type of event or suspicious event and respective location; each Local Unit is associated with a geographical cluster;
Each Local Entity comprises sensory means adapted to collect event's raw data from an event's site within the geographical cluster of the Local Unit to which is assigned; and
Each Agent Entity comprises input and output means configured to collect event's raw data, from an event's site within a geographical cluster of a Local Unit to which is assigned and to receive event's intelligence indications.

2. System according to claim 1, wherein a Local Unit further comprises an Agent's list management Entity adapted to manage a list of Agents assigned to a Local Unit; said Entity comprising processing means programmed to:
assign an Agent Entity which current geographic location is within the geographical cluster of a Local Unit, and update the list of Agents;
remove an Agent Entity from the list of Agents assigned to a Local Unit which current geographic location is not within the geographical clusters of said Local Unit.

3. System according to claim 2, wherein the Local Unit is configured to establish a bidirectional communication channel with at least one Agent Entity of the list of Agents assigned to it; said communication channel is adapted to:
transmit a request for supplementary event's raw data from a Local Unit to an Agent Entity; and
transmit supplementary event's raw data collected from an Agent Entity to a Local Unit.

4. System according to claim 1, wherein the type of event or suspicious event relate to a fire, a terrorist attack, a robbery, a traffic accident or a natural catastrophe;
and wherein,
the event's raw data further includes data related to the event or suspicious event, such as, topography information of the event's site, event's time, number of people involved in the event, information referring to the appearance or non-verbal communication of people in the event's site;
the event's raw data further relates to health status of a user carrying an Agent Entity, such as heart rate, blood pressure, body temperature, motion evaluation.

5. System according to claim 1, wherein the sensory means of a Local Entity includes video and audio sensors; the raw data of such local entities being a stream of video or audio data, respectively;
the sensory means of a Local Entity further includes a plurality of sensor units, such sensor units being of acoustic, sound, vibration, chemical, temperature, environment or proximity type.

6. System according to claim 1, further comprising an event base-model database where event models and respective intelligence indications are stored; wherein the Central Processing Unit being further programmed to access to the event base-model database to select an event model based on processed-data sent by Local Units.

7. System according to claim 6, wherein the Central Processing Unit further comprises an Artificial Intelligence module configured to:
   determine an event's thread classification and risk level, based on the processed-data sent by Local Units and based on the event models stored in the event base-model database; and
   generate the event model and the respective intelligence indications based on said thread classification and risk level.

8. System according to claim 7, wherein an Agent Entity is of a collective or a singular type; wherein
   a collective-A ent is a processing device comprising means for controlling a plurality of emergency actuation modules; such modules being related to dedicated sirens, speakers, alarm sounds, entrance control mechanisms and emergency light guidance mechanism; and
   a singular-Agent is a mobile processing device, such as a smartphone.

9. System according to claim 8, wherein the Central Processing Unit comprises a manager Entity configured to implement a multilevel-hierarchical scheme, wherein to each Agent Entity is attributed a rank value; the manager Entity being programmed to dynamically attribute a rank value of each Agent Entity based on:
   the thread classification and risk level of the event model;
   the type of Agent Entity;
   Agent's location and the Local Unit to which it is assigned, in relation to the location of the event;
   And wherein,
   a list of Agents and respective rank values are stored in memory means of the Central Processing Unit, and
   the manager Entity and the Agent's list management Entity of each Local Unit being operatively connected.

10. System according to claim 9, wherein the intelligence indications contained in the event model are generated for each Agent Entity based on its rank value, by the Central Processing Unit; said intelligence indications contain live recommendations, security directives and emergency protocol instructions.

11. System according to claim 1, further comprising a communication platform configured to establish a bidirectional data communication protocol adapted to transmit event's intelligence indications from the Central Processing Unit to Agent Entities via SMS, phone call, audio signal, video signal, push notifications, email or coded control information; and wherein the communication platform also comprises an interface module configured receive input parameters from an Agent Entity and to implement a graphical interface of a dashboard of events; the Central Processing unit being further configured to update the dashboard of events based on processed-data sent by Local Units and on event's intelligence indications generated by the Central Processing Unit to an Agent Entity.

12. Method of operating the system of claim 1, comprising the following steps:
   Collecting event's raw data by a plurality of Agent Entities and Local Entities, assigned to a Local Unit;
   Generating processed-data by a Local Unit, based on the event's raw data collected by the Agent Entities and Local Entities assigned to it;
   Generating an event model by the Central Processing Unit based on the processed-data sent by Local Units;
   Sending intelligence indications to a plurality of Agent Entities by the Central Processing Unit.

13. Method according to claim 12, wherein the Central Processing Unit is adapted to operate in two modes of operation:
   a preventative mode (c2.), wherein the event's raw data relates to a suspicious event; and
   an emergency mode (c1.), wherein the event's raw data relates to an event;
   the intelligence indications being generated by the Artificial Intelligence module of the Central Processing Unit, based on a thread classification and on a risk level, and wherein
   the Central Processing Unit is adapted to operate in both modes of operation at the same time depending on the Agent's location within a geographical cluster of a Local Unit, in relation to the location of an event and of a suspicious event.

14. Method according to claim 13, wherein the Central Processing Unit is further configured to operate in a training mode (c3.) wherein the Artificial Module of the Central Processing Unit is adapted to simulate a real event based on the event's raw data related to a suspicious event and on the event models stored at an event base-model database; the output of the training mode being used by the Artificial Intelligence Module of the Central Processing Unit to generate intelligence indications.

15. Method according to claim 12, wherein in the Central Processing Unit generates an event model depending on:
   the type of event;
   the location of the event;
   the number of Agent Entities sending event's raw data within
   the geographical cluster of a Local Unit to which is assigned.

* * * * *